United States Patent [19]

Cahajla

[11] Patent Number: 5,699,754

[45] Date of Patent: Dec. 23, 1997

[54] LITTER BOX

[76] Inventor: Janice Cahajla, 3736 S. 53rd Ct., Cicero, Ill. 60650

[21] Appl. No.: 594,436

[22] Filed: Jan. 31, 1996

[51] Int. Cl.⁶ .............................. A01K 29/00; A01K 1/01
[52] U.S. Cl. ............................................ 119/166; 119/165
[58] Field of Search ................................ 119/166, 167, 119/165

[56] References Cited

U.S. PATENT DOCUMENTS

| | | | |
|---|---|---|---|
| 4,308,825 | 1/1982 | Stepanian | 119/167 |
| 4,487,163 | 12/1984 | Jobert et al. | 119/166 |
| 4,534,315 | 8/1985 | Sweeney | 119/166 |
| 4,649,578 | 3/1987 | Vargo | 119/1 |
| 5,184,574 | 2/1993 | Kirk et al. | 119/166 |
| 5,289,800 | 3/1994 | Walton | 119/165 |
| 5,293,837 | 3/1994 | Caldwell | 119/166 |
| 5,353,743 | 10/1994 | Walton | 119/166 |
| 5,499,610 | 3/1996 | Bruner et al. | 119/166 |
| 5,515,812 | 5/1996 | Faust | 119/166 |

FOREIGN PATENT DOCUMENTS

| | | | |
|---|---|---|---|
| 0259293 | 3/1988 | European Pat. Off. | 119/166 |
| 2141613 | 1/1985 | United Kingdom | 119/165 |

*Primary Examiner*—Edgar S. Burr
*Assistant Examiner*—Amanda B. Sandusky
*Attorney, Agent, or Firm*—Hill, Steadman & Simpson

[57] ABSTRACT

A litter box is provided having a litter-holding tray supported over a urine-collection cavity. The litter is contained within a disposable element which generally lines the tray. The disposable element and tray are permeable by liquids so that liquid waste falls from the litter cavity to the lower urine-collection cavity. The disposable element may be lifted and disposed of, along with the litter, in a clean and sanitary manner which avoids touching of the litter. The top, bottom container and tray are stackable and securable together in an easily disassemblable manner. The disposable element is preferably made of a biodegradable material including cornstarch and soy protein or a suitable biodegradable paper.

11 Claims, 2 Drawing Sheets

LITTER BOX

BACKGROUND OF THE INVENTION

The present invention generally relates to litter boxes of the type used indoors for domestic cats. Such litter boxes hold a bed of litter material to receive and contain cat feces and urine. More particularly, the present invention relates to a litter box having a sanitary means for exchanging and disposing of cat litter, and further relates to a litter box having a separate urine collection means.

Litter boxes are known which have a urine collection container separate from the litter bed. For example, U.S. Pat. Nos. 5,184,574 and 4,649,578 disclose cat litter boxes having a tray containing cat litter and resting above a funnel for collection of liquid waste.

Conventional single-tray litter boxes are filled with cat litter which receives liquid and solid waste. Regular cleaning of such litter boxes is an unpleasant but necessary task. Feces must be removed from the litter, or the litter must be replaced altogether. Moreover, any unabsorbed urine must be removed. It is desirable to further hygienically improve the changing of litter and the removal of solid and liquid waste matter. For instance, it is recognized that pregnant women are subject to certain health dangers by touching or even smelling cat waste. Therefore, it is desirable to make the removal and disposal of used litter as simple and sanitary as possible and to minimize the potential for touching the litter. The aforementioned litter boxes having separate urine collection containers have hygienically improved the process of cleaning litter boxes through the separate urine-collection means. However, further improvement is desired for the sanitary removal of litter and in the overall construction of litter boxes.

SUMMARY OF THE INVENTION

The present invention provides a cat litter box having features improving the hygiene and ease of changing litter. To this end, a litter box according to the present invention includes a bottom container, which defines a urine-collection cavity, a tray supported over the urine-collection cavity, the tray defining a litter cavity and having a perforated litter-support surface, a disposable element shaped to generally line the litter cavity, and a top forming a wall extending upwardly from the tray.

The present invention also provides an improved and simple structure. The bottom container, tray and top are configured to be stackable in a nestled manner. Also, in an embodiment, the litter box has a generally circular shape, the top securing to the bottom with a threaded engagement which also secures the tray in its intermediate position.

The disposable element is a litter cavity liner which holds the cat litter and may be easily removed while containing the cat litter. The disposable element is porous so that liquid waste may seep through into the urine-collection cavity. This permits a person to change cat litter without ever touching it. Changing of the disposable element might be analogized to removing a coffee filter containing coffee grounds from a coffee maker.

In a preferred embodiment, disposable element is a biodegradable litter cavity liner made of a material containing cornstarch and soy protein. This material is viable, environmentally friendly, and is used in many one-time or short-term use items, e.g., drinking cups, eating utensils, bags and food containers. Both materials are used as formulated and molded into biodegradable food grade plastic.

The driving force behind this new grain based product is our environment. Our world and its environment are very important. The demand is growing for products and materials that promote a cleaner environment. The products produced from biodegradable plastics have a certain amount of water resistance, but will dissolve in water or biodegrade after a short time. Thus, making the disposable liner element from biodegradable material will slow the environmental burden otherwise caused by non-biodegradable waste. For example, the liner element might be compared to disposable diapers, although the present invention's biodegradability gives the advantage of being cleaner and healthier in the environment.

Also, in the embodiment wherein the biodegradable material is made from food grade ingredients, such as the cornstarch and soy protein combination, the material maintains its nutritional value. Thus, the discarded liner components may be collected and ground into pellets for use in livestock feed.

Therefore, an advantage of the present invention is to provide a litter box which is convenient and easy to use. A related advantage is that the disposable liner makes the chore of litter changing easier and less unpleasant.

Additional features and advantages of the present invention are described in, and will be apparent from, the detailed description of the presently preferred embodiments and from the drawings.

BRIEF DESCRIPTION OF THIS DRAWINGS

DETAILED DESCRIPTION OF THE PRESENTLY PREFERRED EMBODIMENTS

Figure 1:
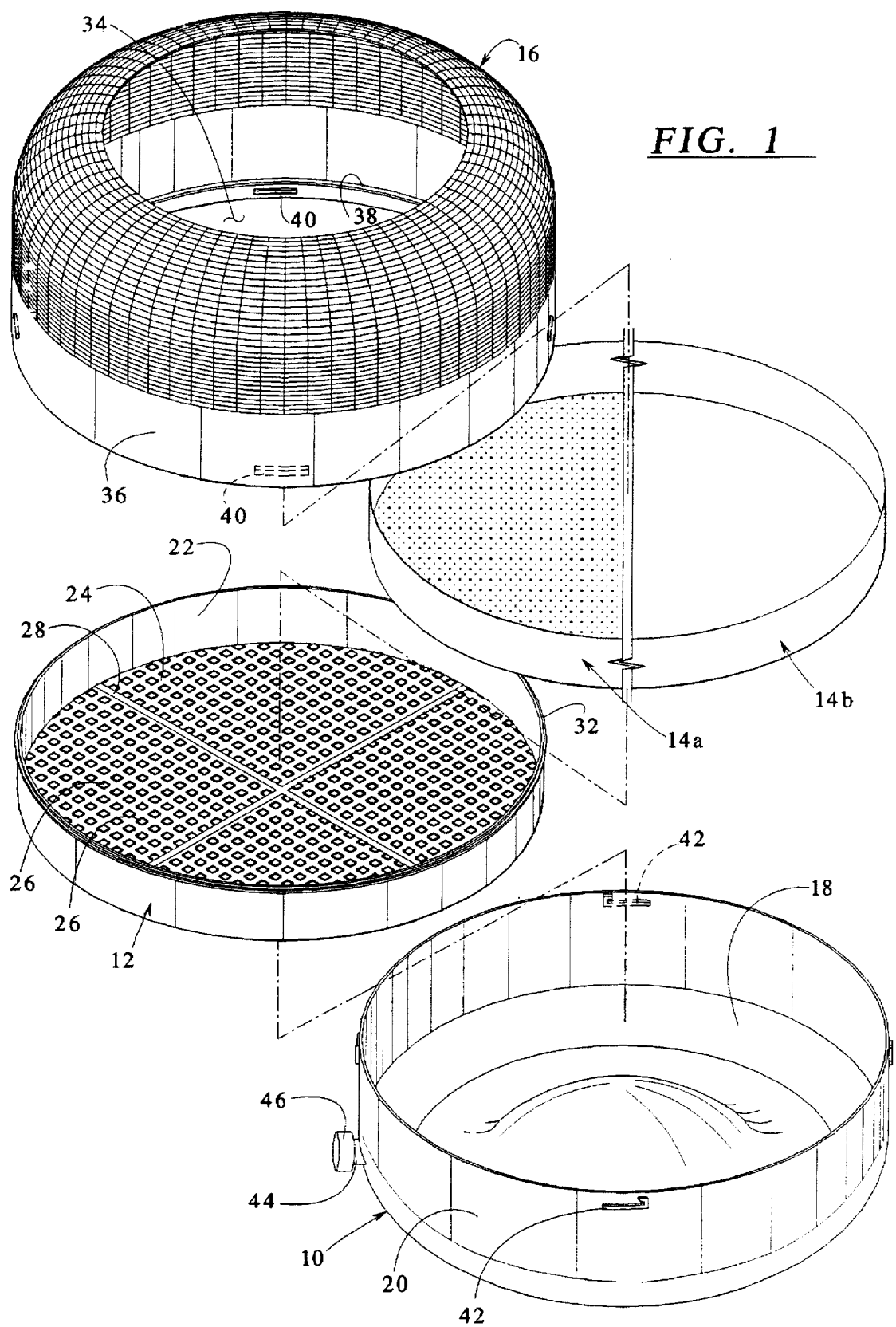
FIG. 1 is an exploded perspective view of a litter box according to the present invention.
Figure 2:
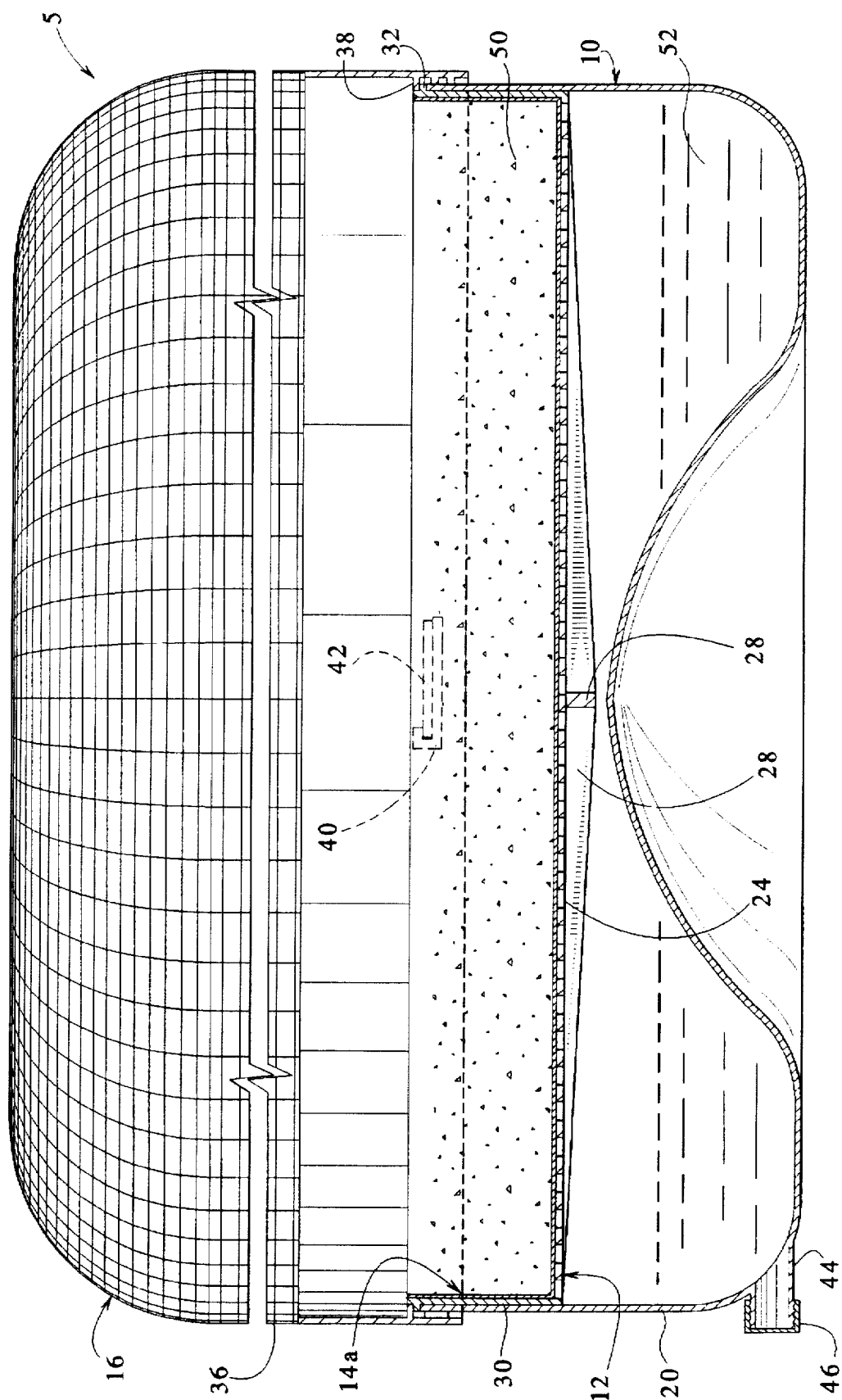
FIG. 2 is a sectional view of the litter box of FIG. 1 in an assembled state.

As illustrated in FIGS. 1 and 2, the present invention provides a cat litter box 5 including a bottom container 10, a tray 12, a disposable element 14a or 14b and a top 16. The top 16, tray 12 and bottom container 10 stack together in a nestled manner. The bottom container 10 is shaped to define a urine-collection cavity 18 which is open in an upwardly direction. The bottom container 10 has an upwardly extending sidewall 20. The tray 12 is shaped to define a litter cavity 22. The tray 12 has a rigid litter-support surface 24 which has a plurality of perforations and preferably has reinforcing ribs 28 for rigidity. The tray 12 also has a vertical sidewall 30 having an outer diameter slightly smaller than the inner diameter of the sidewall 20 of the bottom container 10.

The tray 12 is partially received into the bottom container 10 and is supported thereon. To this end, the tray 12 has an outer peripherally-extending lip 32 having a diameter larger than the inner diameter of the bottom container 10. As illustrated in FIG. 2, this lip 32 rests against a top edge of the bottom container 10. Thereby, the tray 12 is supported so that the perforated litter-supporting surface 24 extends across the urine-collection cavity 18.

The disposable element 14a, 14b is shaped to generally line the litter cavity. In other words, it is shaped to fit closely inside the tray 12. In a preferred embodiment, the disposable element 14a is made of a biodegradable plastic having a plurality of pores formed therein. However, the disposable element could be made of any suitable material which is preferably biodegradable and which is strong enough to temporarily contain used cat litter without rupturing in the presence of moisture. Known biodegradable plastics exist which include, for example, materials such as corn starch and soybean protein. Also, the disposable element could be made of recycled plastic.

Also, instead of the disposable element 14a, having pores formed therein, the disposable element 14b may be provided which is made of a suitable material but does not have extra pores formed therein. For example, such a suitable material might a liquid-permeable material without formed pores, such as specialized paper materials, like reinforced paper of the type used for coffee filters. The disposable element 14b might also be a non-liquid-permeable material which does not allow urine to separate from the litter. With any of these embodiments for the disposable element 14a or 14b, the litter might foreseeably go unchanged for a period of several days. Thus, the biodegradable material should be selected such that the disposable element 14a, 14b will not significantly degrade and weaken within that time.

The top 16 has an upper opening 34 (FIG. 1) large enough for a cat to easily enter and exit. The top 16 also has a vertical sidewall 36. As shown in FIG. 2, the inner diameter of the sidewall 36 of the top 16 is slightly larger than the outer diameter of the sidewall 20 of the bottom container 10 so that the top 16 may be received partially over the bottom container 10. As illustrated in FIGS. 1 and 2, the top 16 has an interior circumferential lip 38 which rests against a top of the lip 32 of the tray, positioning the top 16. Threads 40 and 42 are provided on the interior of the top 16 and the exterior of the bottom container 10, respectively, for securing the top 16 and bottom container 10 together with the lip 32 of the tray 12 secured inbetween.

The threads 40 and 42 permit easy removal of the top 16 for cleaning and litter replacement. As mentioned, the disposable element 14a or 14b is placed in the litter cavity 22 of the tray 12. Conventional cat litter 50 (FIG. 2) is then placed into the litter cavity 22. The top 16 is then secured over the tray 12 and bottom container 10 by tightening the threads.

During use, a cat may enter the litter box 5 by jumping or climbing through the opening 34. The sidewall 36 of the top 16 prevents litter from being kicked out of the litter box 5. Solid waste matter is received by the litter material, while liquid waste matter, which is not absorbed by the litter, passes through the pores in the disposable element and through the perforation 26 of the litter-supporting surface 24. This liquid waste 52 (FIG. 2), or urine, collects in the urine-collection cavity 18 at the bottom of the litter box 5. The cat may then exit the litter box 5 through the opening 34.

Because the cat climbs over the top 16, the top 16 is preferably rigid enough that it will not collapse under the cat's weight. Similarly, the litter-supporting surface 24 of the tray 12 is sturdy and rigid enough that it can adequately support the litter and the cat's weight. For this reason, the reinforcing ribs 28 are preferred.

Although rigid, the top 16 is also perforated, having a rigid screen-like structure, such as that of a plastic colander, for example. This screen-like structure preferably defines the rounded upper portion of the top and extends downwardly to approximately halfway along the vertical sidewall 36. The screen-like structure of the top 16 allows ventilation through the litter box 5 to disperse fumes and odors, making the litter box 5 a healthier environment for a cat to breathe in comparison with some conventional enclosed-type litter boxes.

At least four diseases post deadly risks to any cat who shares a litter pan. For example:
  a) Feline Leukemia is the number one killer of cats. 83% of cats infected will die. Feline Leukemia is spread through feces or urine through contaminated litter pans.
  b) FIP kills at least half a million cats per year in the U.S alone. FIP is spread through feces, urine, and contaminated litter pans.
  c) FIV is a virus related the AIDS virus in humans. The FIV virus is not communicable to humans. FIV is spread through feces, urine, and contaminated litter pans.
  d) Feline Viral Respiratory Disease is one of the most common infectious diseases among cats. It is a flu-like virus that causes a cat to have a cold. It is very contagious and is spread through contaminated litter pans. Treatment of this disease alone can cost a cat owner hundreds of dollars in veterinary expenses.

Proper use of the litter box 5 according to the present invention helps avoid such diseases through improved hygiene. For easy changing of the litter, the top 16 is removed, and the disposable element 14a or 14b is simply lifted from the tray 12. The disposable element 14a or 14b, still containing the litter 50 and solid waste, is then disposed of. Thereby, there is no need to touch the litter material. A drain opening 44 with a drain plug 46 is provided in the bottom container 10 so that the liquid waste 52 may be simply poured away, such as into a toilet. A fresh disposable element 14a or 14b is then placed in the tray 12 and filled with fresh litter. The top 16, bottom container 10 and tray 12 are then again secured together for reuse.

It should be understood that various changes and modifications to the presently preferred embodiments will be apparent to those skilled in the art. For example, the stackable components might be shaped differently than illustrated or the top 16 might be secured to the bottom container 10 by some securing means other than the thread style illustrated. Such changes and modifications may be made without departing from the spirit and scope of the present invention and without diminishing its attendant advantages. Therefore, the appended claims are intended to cover such changes and modifications.

What is claimed is:

1. A litter box comprising:
   a bottom container having a generally circular vertical sidewall and defining a urine-collection cavity;
   a tray having a generally circular vertical sidewall and a perforated litter-support surface defining a litter cavity, the tray also including a lip on an exterior of its sidewall to support the tray against the sidewall of the bottom container;
   a top having a generally circular vertical sidewall and a cat-access opening, the sidewall of the top fitting over the tray and securing to the bottom container, the top being shaped to abut the tray so that the tray is secured between the top and bottom container; and
   a lip on an interior of the sidewall of the top which abuts against the lip of the tray and presses the tray against the bottom container.

2. The litter box according to claim 1, further comprising:

a liquid-permeable disposable element shaped to generally line the litter cavity of the tray.

3. The litter box according to claim 2, wherein the disposable element is made of plastic having small holes therein.

4. The litter box according to claim 3, wherein the plastic is biodegradable.

5. The litter box according to claim 3, wherein the disposable element is made of recycled plastic.

6. The litter box according to claim 2, wherein the disposable element is paper.

7. The litter box according to claim 1, wherein the top and bottom containers are securable together by a threaded engagement with each other.

8. The litter box according to claim 1 wherein the sidewall of the tray has an outer diameter smaller than an inner diameter of the sidewall of the bottom container, and wherein the lip has a dimension larger than the inner diameter of the sidewall of the bottom container.

9. The litter box according to claim 1, wherein the sidewall of the top has an inner diameter larger than an outer diameter of the bottom container.

10. The litter box according to claim 1, further comprising:

a drain opening formed in the bottom container; and a drain plug sealably securable over the drain opening.

11. The litter box according to claim 1, wherein at least part of said sidewall of said top is screen-like.

* * * * *